(12) United States Patent
Duman

(10) Patent No.: US 10,462,960 B2
(45) Date of Patent: Nov. 5, 2019

(54) TWIN ROW SEED DISTRIBUTOR SYSTEM

(71) Applicant: ÖZDÖKEN TARIM MAKINALARI SANAYI VE TICARET ANONIM SIRKETI, Selçuklu, Konya (TR)

(72) Inventor: Mevlüt Duman, Konya (TR)

(73) Assignee: ÖZDÖKEN TARIM MAKINALARI SANAYI VE TICARET ANONIM, Selçuklu, Konya (TR)

( * ) Notice: Subject to any disclaimer, the term of this patent is extended or adjusted under 35 U.S.C. 154(b) by 115 days.

(21) Appl. No.: 15/804,509

(22) Filed: Nov. 6, 2017

(65) Prior Publication Data

US 2018/0092291 A1 Apr. 5, 2018

Related U.S. Application Data

(63) Continuation-in-part of application No. PCT/TR2016/050078, filed on Mar. 24, 2016.

(51) Int. Cl.
*A01C 7/04* (2006.01)
*A01C 21/00* (2006.01)
*A01C 19/00* (2006.01)

(52) U.S. Cl.
CPC ............ *A01C 7/046* (2013.01); *A01C 21/005* (2013.01); *A01C 19/00* (2013.01)

(58) Field of Classification Search
CPC .............................. A01C 7/046; A01C 21/005
See application file for complete search history.

(56) References Cited

U.S. PATENT DOCUMENTS

| 4,285,444 A * | 8/1981 | Tye ................... | A01C 7/046 221/211 |
|---|---|---|---|
| 2002/0062771 A1 | 5/2002 | Unruh | |
| 2009/0013909 A1 | 1/2009 | Wendte | |
| 2015/0289441 A1* | 10/2015 | Arnett ................. | A01C 7/044 111/185 |
| 2016/0128267 A1* | 5/2016 | Garner ................ | A01C 7/044 111/185 |
| 2016/0192580 A1* | 7/2016 | Wendte ............... | A01C 19/02 111/177 |

FOREIGN PATENT DOCUMENTS

WO 2010129761 A1 11/2010

* cited by examiner

*Primary Examiner* — Alicia Torres
(74) *Attorney, Agent, or Firm* — Egbert Law Offices, PLLC

(57) ABSTRACT

A twin row seed distributor body group is provided that enables twin sowing with a single seed distributor body of pneumatic sowing machines utilized in the agricultural industry. The twin row seed distributor body group contains at least one twin row seed distributor body provided for each sowing unit enabling synchronized sowing on two different sowing rows, at least one right and one left seeding disc, at least one shaft bearing group enabling the movement of seeding discs, at least one seeding disc motion shaft enabling the synchronized movement of the seeding discs, at least one modular main body inner bearing cover that enables fast mounting and maintenance of the disc shaft motion gear and disc motion gears operating inside the seed distributor body and also that forms a bearing for the seeding disc motion shaft, and a hinged seed discharge gate.

13 Claims, 7 Drawing Sheets

Figure — 4

TWIN ROW SEED DISTRIBUTOR SYSTEM

CROSS-REFERENCE TO RELATED APPLICATIONS

The present application is a continuation-in-part of International Application No. PCT/TR2016/050078, filed on Mar. 24, 2016, presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The invention relates to a twin row planter distributor that enables sowing on two different sowing rows at the same time with a single seed distributor system by using pneumatic sowing machines (precision planter) utilized in agricultural industry for planting on fields.

The invention particularly enables sowing on two different rows at the same time in a completely synchronized manner and with a much narrower row distance by using the developed twin seed distributor. Thus, it relates to the enhancement of plant development and yield by increasing seed population per unit area as desired and by more precise distance between crops with conventional harvesting and row crop cultivators without modification.

2. Description of Related Art Including Information Disclosed Under 37 CFR 1.97 and 37 CFR 1.98

Pneumatic precision planters performing twin sowing in the state of the art include the production of two separate seed distributor bodies and two separate sowing unit frames that provide the connection of the distributor with the machine. These row unit frames are available in agricultural machinery industry as:

1. Two row units perform independently of each other; and
2. Two row units perform dependently of each other.

Due to the structural impossibilities of these row units that are manufactured dependent or independent of each other; row units and distributors can be positioned at least 20 cm or further apart from each other and they cannot be manufactured in narrower dimensions. This distance between rows in sowing process is extremely important during harvesting and cultivation processes. Since harvesting and cultivation machines available in the market are manufactured for sowing in single rows, they can't be fully operational in twin sowing with 20 cm or higher distances.

Although the distance G in FIG. 6 is desired to be wider in the cultivation process, it being narrower for such machines performing twin sowing results in cultivation components and also the wheels of the tractor moving much more closer to the plant. Therefore, these factors harm the plant (trampling the plant) from time to time with the slightest steering maneuver of the tractor driver and result in yield loss. Machine manufacturers, who want to prevent this, have to expand the row distance of twin sowing—designated by distance E in FIG. 6—in their machines in order to increase the distance G. This results in a decrease in the number of sown products per unit area.

Distance A shown in FIG. 6 is at least 20 cm or more in state of the art sowing.

However, harvester headers are formed according to single row sowing methods. The distance G in FIG. 6 is preferred to be wider during cultivation process whereas, on the contrary the distance A in FIG. 6 is preferred to be narrower due to the fact that the structural properties of harvesting machines are suitable for single row harvesting. During sowing with a twin sowing machine, the distance A being 20 cm or more leads to incomplete harvesting of the crops by the harvesting machine. This causes product waste and reduces the yield.

In state of the art, seed distributor bodies of twin sowing machines are either individually driven by separate motion mechanisms or the bodies are connected to each other using various methods and then tried to be synchronized; thus cross sowing is performed on two different rows. This results in problems for synchronized operation of seed distributor bodies and increases errors in seeding unit area as shown in FIG. 7.

Longitudinal seed distance that has to be as the distances B and C in FIG. 6 results in faulty sowing in state of the art. Due to the longitudinal seed distance being too close from time to time as shown in FIG. 7, plants and roots can't have enough growing room therefore yield is decreased.

Another disadvantage of existing systems that are tried to be synchronized afterwards is the increased machine costs and also increased possibility of malfunction and it becoming harder for the system to run in synchronism due to the used extra parts and motion mechanisms. Moreover, tractors with higher horsepower are required because these extra parts increase the weight of machines.

Patent research in the state of art revealed the European Patent Application EP 1920647 B1, which is described as "A twin row planter comprises a drive and a pair of planter units powered by the drive. The planter units include seed metering wheels that are synchronized to discharge seeds in a predetermined staggered pattern along a harvesting row. One of the planter units is adjustable relative to the drive so as to achieve the desired pattern. In particular, the adjustable planter unit includes a connector that is configurable into a plurality of discrete indexing positions. The connector positions determine the relative angular offset between the metering wheels and, thereby, control the spacing of seed within the pattern".

In the patent search carried out in the state of art, the invention in the application WO2010/129761 A1 PCT comprises of two seed distributor bodies. The present invention comprises a single seed distributor body. In WO2010/129761 A1, seed distribution is achieved by means of moving the seed distributor bodies through a connection shaft mechanism comprised of parts passing therebetween.

Therefore, in case of any changing pertaining to rear seed distributor body, the front seed distributor body should be removed. This problem is solved in the present invention. Furthermore, in the invention WO2010/129761 A1, the two bodies consist of parts that are connected to each other with a pivoted mechanism and of the mechanism that transmits the movement to another. Therefore, contrary to the invention WO2010/129761 A1 having a structure that may require a synchronisation control, the present invention requires no synchronisation control in case of disassembling and assembling or in any other case, during seed distributing. The present invention always functions adjusted because the movement transmission shaft comprises of a single part.

Consequently, twin row seed distributor bodies are being improved and therefore novel embodiments to eliminate the abovementioned disadvantages and to provide solutions for the existing systems are needed.

BRIEF SUMMARY OF THE INVENTION

The present invention relates to twin row seed distributor body that compensate the abovementioned needs, eliminates all disadvantages and provides some additional advantages.

An object of the invention is to meet the demand in seed sowing by rendering the distance between two rows, shown as distance A in FIG. 6, minimum 10 cm or wider.

Another object of the invention is to enable sowing by not disrupting the bed lines formed on the field on which bed planting will be performed by minimizing the distance A shown in FIG. 6.

Another object of the invention is to minimize the risk of tractor's rear wheels damaging (trampling) the plant with the slightest steering maneuver of the tractor driver by increasing distance G through minimizing spacing A without the need to expand the distance E in FIG. 6 during plant row crop cultivation process.

Another object of the invention is to eliminate the need the change inter-row spacing of mowing mechanisms (header) in harvesting machines due to the suitable twin sowing inter-row spacing for harvesting machines obtained by minimizing the distance A without changing the distance E in FIG. 6.

Another object of the invention is to enable easy harvesting and minimize yield loss during harvest by taking the plant completely in between the stem-picking openings of the harvest machine and directing it entirely to the picking unit during harvesting of cotton and similar plants by using the twin row distributor body that will enable narrow row planting due to distance A in FIG. 6.

Another object of the invention is to render the machine more lightweight and reduce the required tractor horsepower by using one twin row distributor body, single seed hopper and single motion mechanism.

Another object of the invention is to enable simple, more precise, twin sowing by running in synchronism by taking the seed to seed distributor discs and leaving it on the soil at the same time thus enabling synchronized seeding with the mechanism that provides motion to one twin row seed distributor body.

Another object of the invention is to reduce production costs by decreasing the number of seed hopper and motion providing equipment of the sowing system, which has one twin row seeding distributor body, to one.

Another object of the invention is to provide ease of use and save time by enabling easy change of seeding discs on twin row seed distributor bodies in case of seed change and to provide fast mounting of the seeding discs suitable for the new seed.

The present invention that is mentioned above and designed to provide all advantages as will be understood from the detailed description below; is a twin seeding system with one body that is designed to be used in a twin sowing method in the agricultural industry and that enables completely synchronized sowing on two different sowing rows (double row) wherein:

it contains a twin seed distributor body that enables two different seeding discs to plant seeds on two different sowing rows (double row) within a single body;

it contains motion transmission shafts and bearing bushels that enable seeding discs on both sides to be connected to the body and main body inner bearing cover that enables easily mounting the gear systems inside the body;

it contains a shaft bearing for transmission shafts that can simultaneously provide motion the seeding discs on the mentioned twin row seed distributor body;

it contains a hinged seed discharge gate on the mentioned twin row seed distributor body; and it contains a seed spreading disc motion shaft that provides the simultaneous motion of seeding both sides of the mentioned twin row seed distributor body.

The twin row seed distributor body can be used in any kind of vacuum pneumatic sowing machine without considering the sowing mechanisms.

The structural and characteristic features and all advantages of the invention will be more clearly understood by the figures given below and detailed written description addressed to the figures. Therefore, evaluation should be done by taking into account these figures and the detailed description.

BRIEF DESCRIPTION OF THE SEVERAL VIEWS OF THE DRAWINGS

In order to optimally understand the structure and the advantages of the present invention with additional components, it has to be evaluated in conjunction with the figures explained below.

REFERENCE NUMBERS

1. Twin Row Seed Distributor Body Group
2.a Upper Window Right Side 2.b. Upper Window Left Side
3.a. Inside Seed Singulator Right
3.b. Inside Seed Singulator Left
4a. Seeding Disc Right
4.b. Seeding Disc Left
5.a. Outer Seed Singulator Right
5.b. Outer Seed Singulator Left
6. Rear Window (Right-Left)
7.a. Disc Vacuum Body Gate (Right)
7.b. Disc Vacuum Body Gate (Left)
8. Seed Hopper and Seed Hopper Cover
10. Twin Row Seed Distributor
11. Shaft Bearing Assembly
11.1. Shaft Bearing Body
11.2. Motion Transmission Shaft
11.3. Bearing
11.4. Seal
11.5. Shim
11.6. Retaining Ring
11.7 Bolt
12. Motion Transmission Shaft Bearing Bushel
13. Disc Shaft Motion Gear
14. Split Pin
15. Seeding Disc Motion Shaft Group
15.1. Seeding Disc Motion Shaft
15.2. Seeding Disc Motion Hexagon Shaft
15.3. Shim
15.4. Bolt
15.5 Wedge
15.6 Gear Fixing Nut
16. Disc Shaft Bearing Bushel
17. Disc Motion Gear
18. Main Body Inner Bearing Cover
19. Bolt
20. Hinged Seed Discharge Gate

DETAILED DESCRIPTION OF THE INVENTION

In this detailed description, preferred embodiments of the twin row seed distributor body group (1) of the invention developed for twin (double row) sowing are described only for the better understanding of the subject in a manner not to pose any limiting effects.

Figure 1:
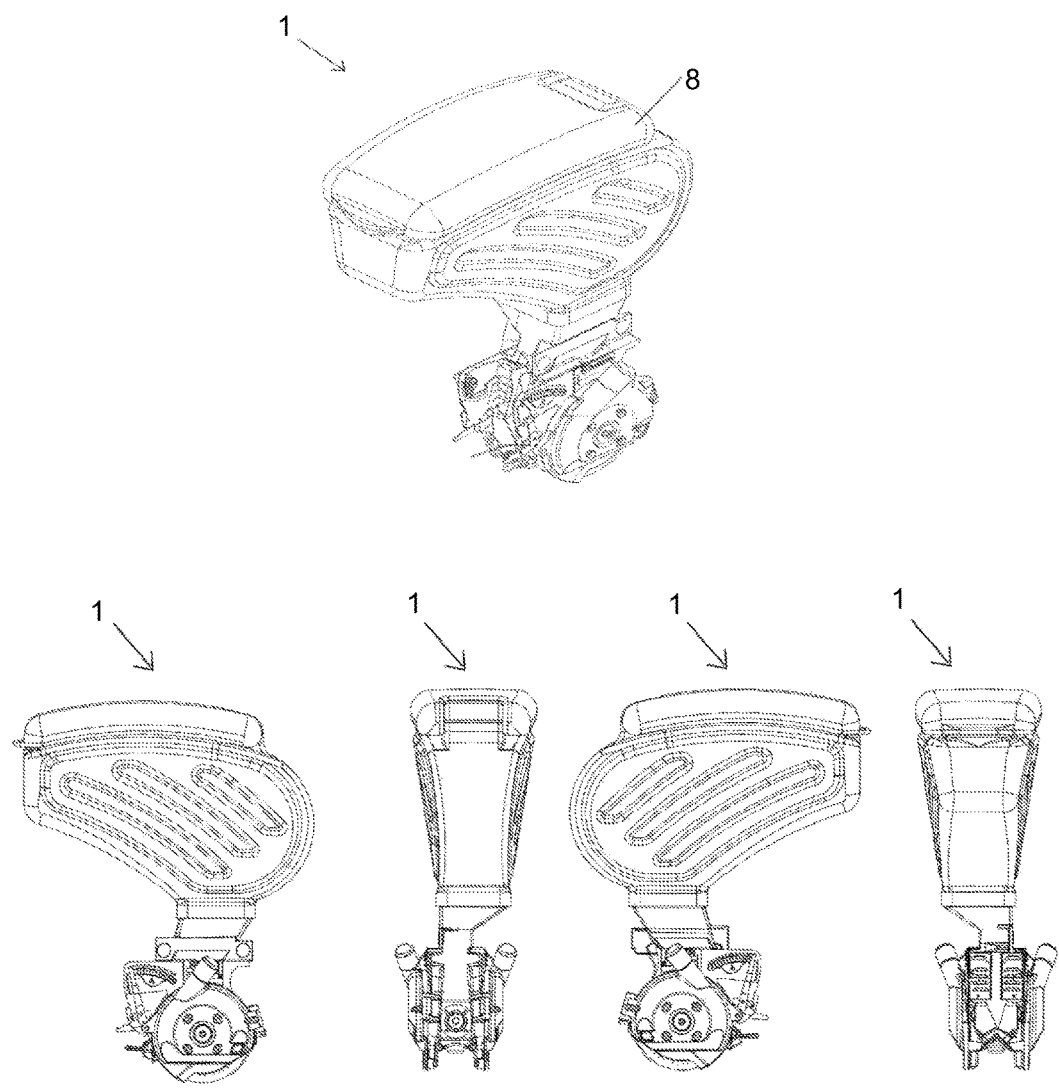
FIG. 1 is a view of the assembled twin row seed distributor body group (1) and seed hopper and seed hopper cover (8) from different angles.
Figure 2:
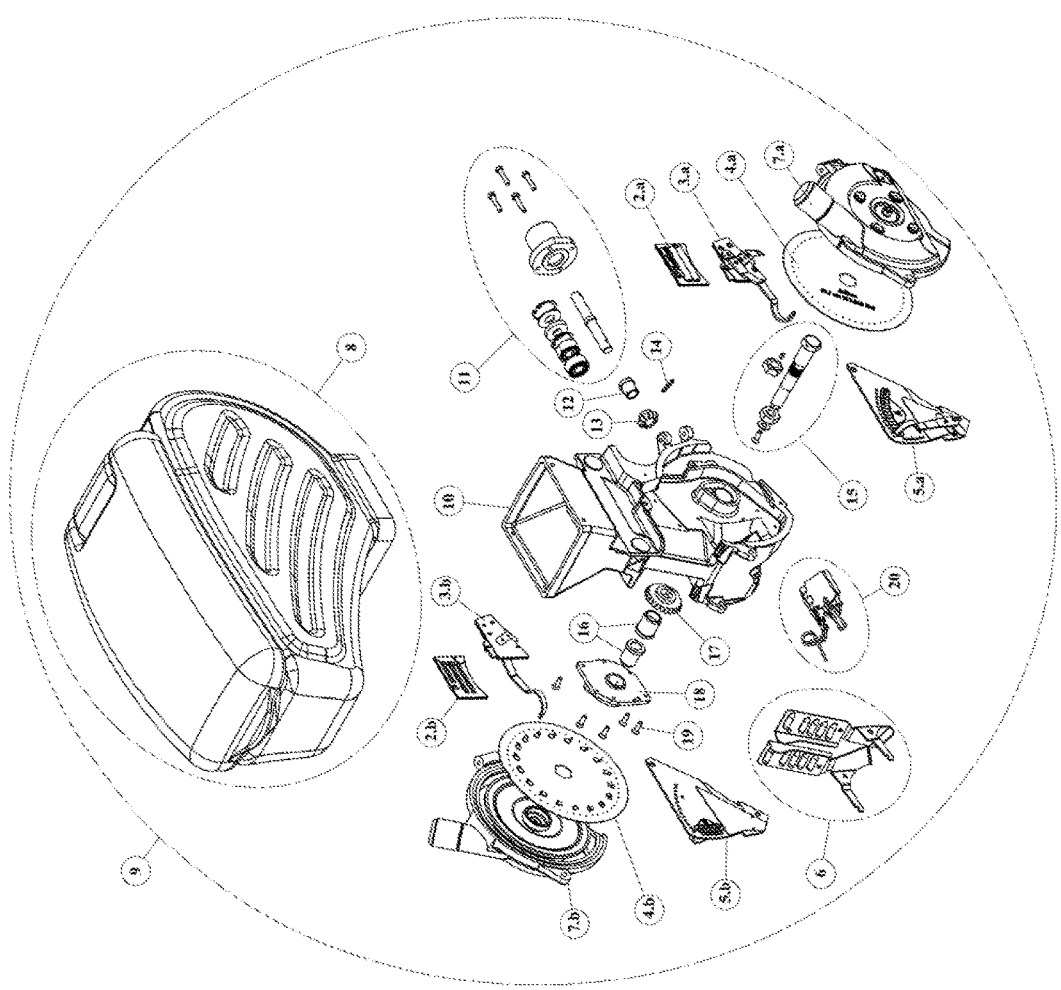
FIG. 2 is a disassembled view of the twin row seed distributor body (10), row unit body inner bearing cover (18) that enables connecting the seeding discs (4.a-4.b) on both sides to the twin row seed distributor body (10), disc vacuum body covers (7.a-7.b), inner and outer scrapers (3.a-3.b-5.a-5.b), seeding discs (4.a-4.b), disc bearing shaft group (15), hinged seed discharge gate (20), rear window covers (6), upper window covers (2.a-2.b), gears (13-17), bearing bushels (12-16), shaft bearing group (11) and seed hopper and seed hopper cover (8).

The invention relates to the innovation carried out in the groups of the seed distributor bodies (1) on the sowing units of the vacuumed-pneumatic based twin sowing machineries used in sowing/planting of fields in the agricultural sector. FIG. 1 and FIG. 2 show groups of twin seed distributor bodies (1) that are the subject matter of the invention and designed to be used in the pneumatic based sowing machineries, and 3-D views of a seed storage and lid (8) in mounted and demounted forms.

The present invention relates to a novelty in seed distributor body groups (1) on the sowing unit of vacuum precision pneumatic twin sowing machines used in planting on fields in the agricultural industry. 3D assembled and disassembled view of the twin row seed distributor body group (1)—developed to be used in pneumatic twin sowing machines—of the invention and seed hopper and seed hopper cover (8) are shown in FIGS. 1 and 2.

The disassembled view in FIG. 2 shows the shaft bearing assembly (11), motion transmission shaft bearing bushel (12), disc shaft motion gear (13), spring pin (14), seeding disc motion shaft group (15), disc shaft bearing bushel (16), disc motion gear (17), main body inner bearing cover (18), bolt (19), hinged seed discharge gate (20), upper window (right-left) (2.a-2.b), inner seed singulator (right-left) (3.a-3.b), seeding discs (right-left) (4.a-4.b), outer singulator (right-left) (5.a-5.b), rear window (right-left) (6), disc vacuum body covers (right-left) (7.a-7.b), seed hopper container and seed hopper cover (8) provided on the twin row seed distributor body (10).

Figure 3:
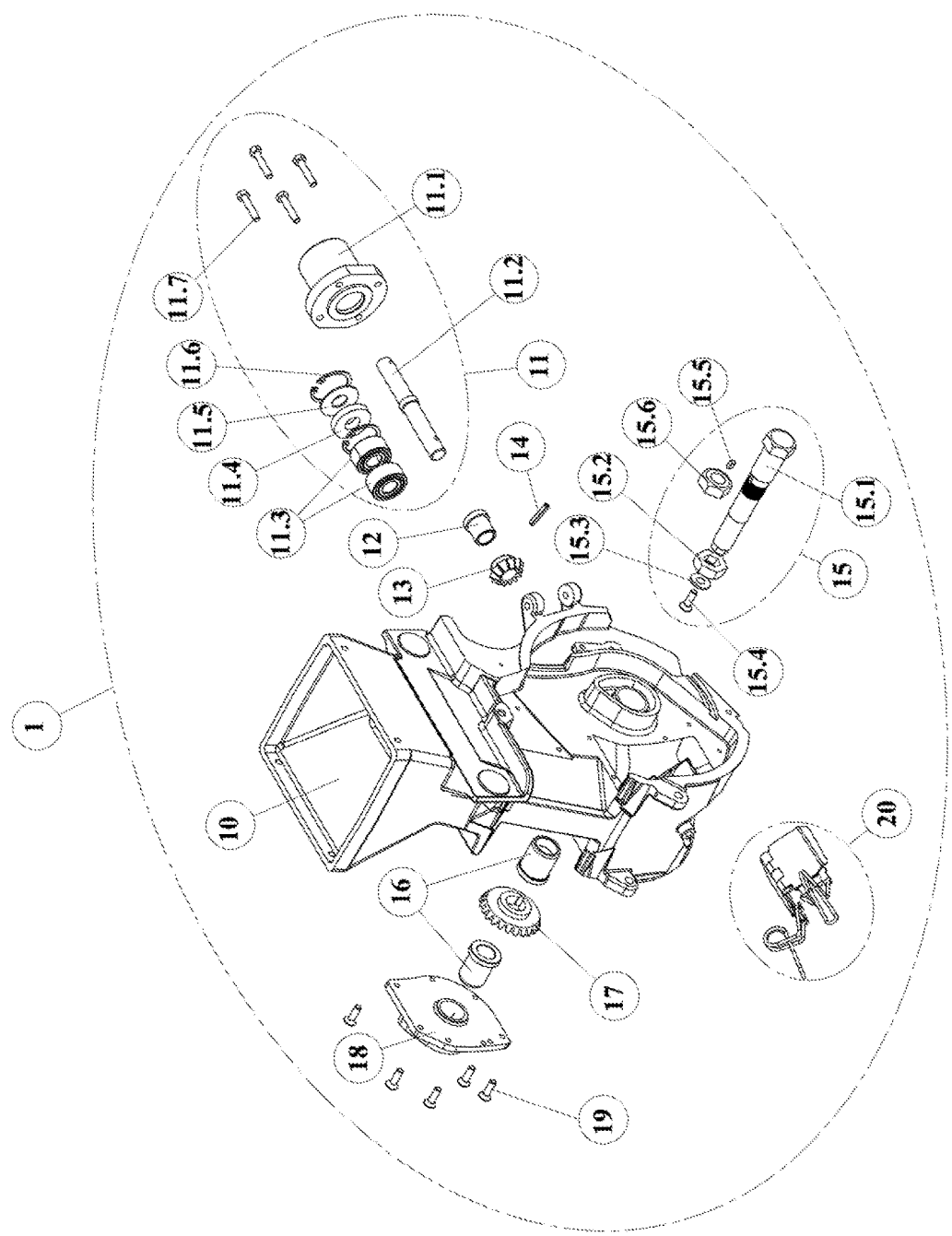
FIG. 3 is a perspective view of the disassembled twin row seed distributor body group (1).
Figure 4:
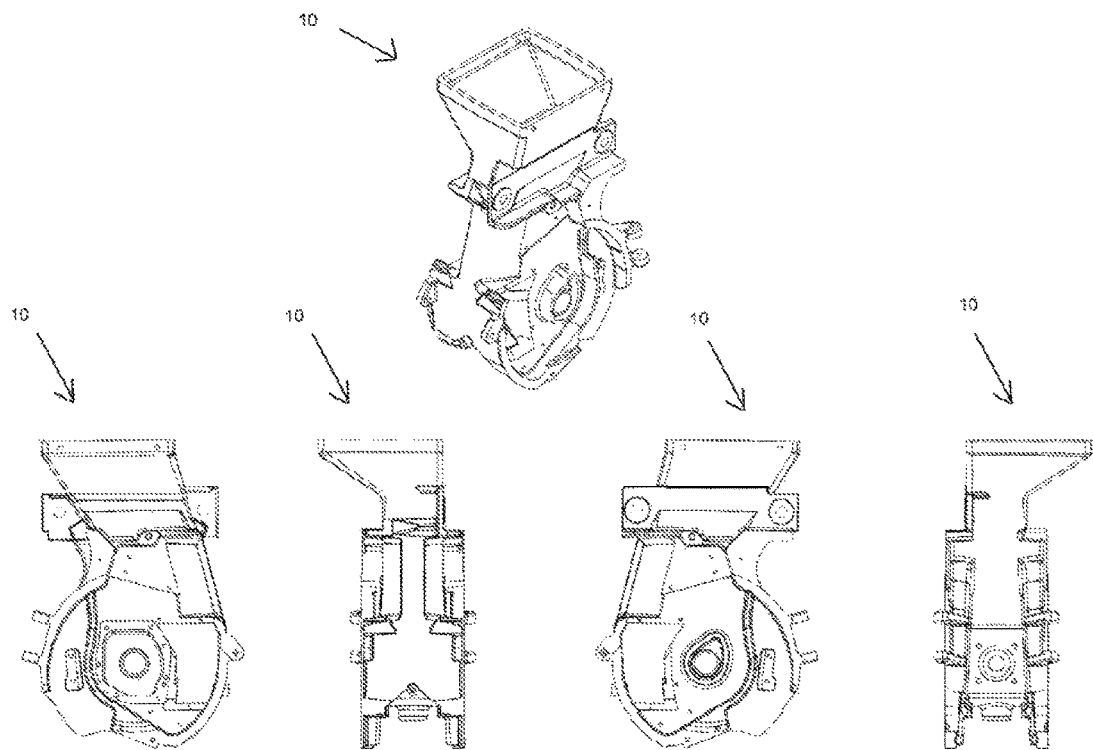
FIG. 4 is a perspective view of the twin row seed distributor body (10) from different angles.
Figure 5:
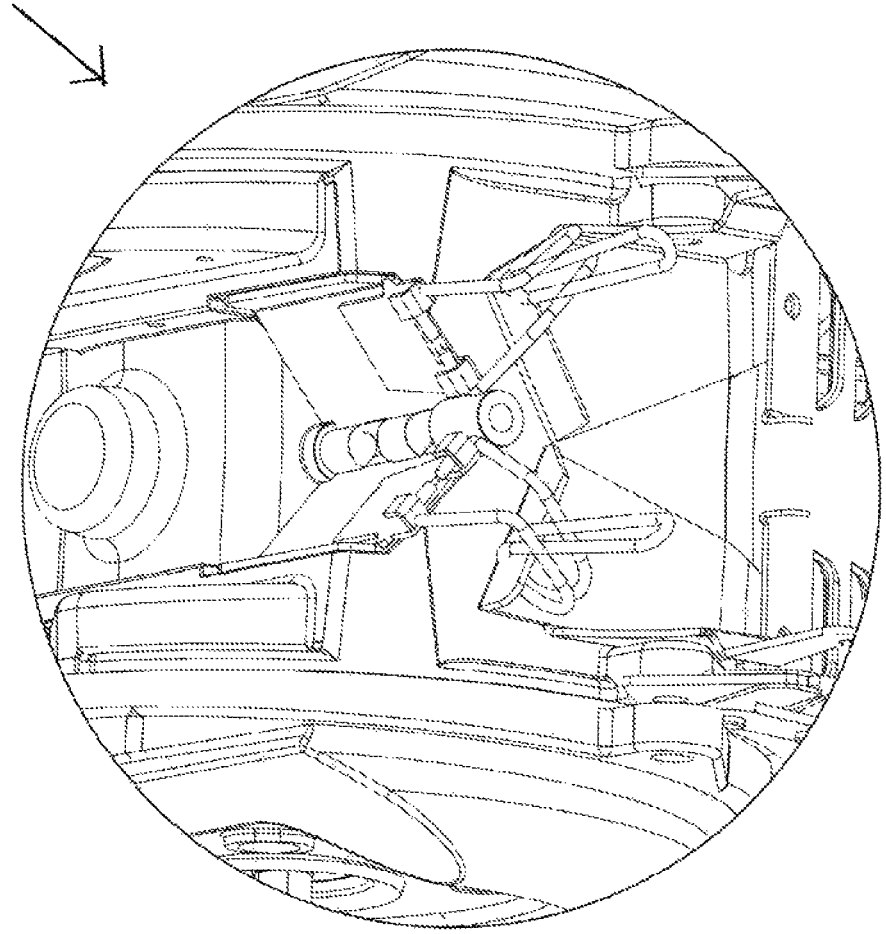
FIG. 5 is a detailed perspective view of the hinged seed discharge gate (20) of the twin row seed distributor body.

FIG. 3 shows one twin row seed distributor body group (1) of the invention, the twin row seed distributor body (10) that enables synchronized sowing on two different sowing rows (double row) at the same time and other mechanism components belonging to the twin row seed distributor body (10) more clearly.

Accordingly, assembly of the twin row seed distributor body group (1):

Consists of mounting the motion transmission shaft (11.2) of the shaft bearing group (11) enabling the motion of seeding discs (4.a-4.b) on the twin row seed distributor body (10) into the shaft bearing body (11.1) by means of ball bearings (11.3), felt ring (11.4), shim (11.5) and retaining ring (11.6).

The mentioned shaft bearing group (11) is again supported by the shaft bearing bushel (12) and connected with the twin row seed distributor body (10) by means of screws (11.7).

After the mentioned shaft bearing group (11) is connected to the twin row seed distributor body (10), disc shaft motion gear (13) is connected to the part of the motion shaft (11.2) that remains inside the body by means of the spring pin (14).

The seeding discs' motion shaft (15.1) enabling the synchronized movement of seeding discs are connected to the twin row seed distributor body (10) by means of main body inner bearing cover (18), cover connection bolts (19) and disc shaft bearing bushes (16).

Disc motion gear (17) is connected on seeding disc motion shaft (15.1) by means of the wedge (15.5) and gear fixing nut (15.6).

Furthermore, the mentioned seeding disc motion shaft (15.1) is fixed to the twin row seed distributor body (10) by connecting with the disc motion hexagon (15.2), shim (15.3) and the bolt (15.4).

Hinged Seed Discharge Gate (20) is used to easily discharge the seed remaining inside the mentioned seed distributor body (10).

The operating principle of the twin row seed distributor body group (1) of the invention is described below.

The basic operation of sowing bodies in pneumatic sowing machines is as follows.

Vacuum created by an air suction fan of the sowing machine is transferred into one vacuum body cover positioned on the body by means of air suction hoses and air suction vacuum is created for the seed distributor body from one direction. Seeds coming from the seed hopper by this air suction vacuum formed in the seed distributor body adhere to the holes on the seeding disc—provided only one for each body—that operates together with the vacuum body cover. Thus, sowing is performed by enabling seeds to remain on the seeding disc until they reach the sowing components.

The twin seed distributor body group (1) of the invention is provided with two disc vacuum body covers (7.a-7.b) unlike standard sowing bodies and these covers are simultaneously connected to the cover connection housings on the right and left sides of the seed distributor body (10). Vacuum created by the air suction fan of the sowing machine is respectively transferred to each cover by two different air hoses. Therefore, air suction vacuum inside the twin row seed distributor body (10) required for the twin sowing method is created on both sides of the body simultaneously. Due to the air suction vacuum formed on both sides of the body, seeds going from the seed hopper (8) to the twin row seed distributor body (10) divide into two inside the body, adhere to the holes on two separate seeding discs (4.*a*-4.*b*) and remain on these discs (4.*a*-4.*b*) until seeds reach the sowing components.

In twin sowing performed by state of the art seed distributor bodies, seeding discs (4.*a*-4.*b*) receive motion from two different motion mechanisms or they receive motion from a single motion mechanism and try to transfer this motion to the other body by means of various systems.

Unlike its counterparts, in twin row seed distributor body group (1) of the invention, shaft bearing group (11) enabling the movement of seeding discs (4.*a*-4.*b*) positioned on one twin row seed distributor body (10) transmits the motion it receives from the motion mechanism to the seeding disc motion shaft (15.1) on which wedge (15.5), gear fixing nut (15.6) and disc motion gear (17) is connected. Disc motion shaft provides motion to two different seeding discs (4.*a*-4.*b*) and enables seeding discs (4.*a*-4.*b*) to run in synchronism without any extra connection components in between.

Essential components of the mechanism that enables twin seed sowing by one seed distributor body of the twin row seed distributor body group (1) are; one twin row seed distributor body (10) and shaft bearing group (11) connected on this body (10) by means of bolts, gears transmitting motion (13-17), disc motion shaft group (15) from which seed spreading disc receives motion, bushes (12-16) that enable bearing the motion transmission shaft (11.2) and disc motion shaft group (15) and main body inner bearing cover (18). Covers (7.*a*-7.*b*) manufactured in the form of a disc are mounted on side surfaces of the twin row seed distributor body (10) in a folding (can be opened and closed) manner. Seeding disc(4.*a*-4.*b*) are mounted on both sides of the body (10) in a detachable manner.

Figure 6:
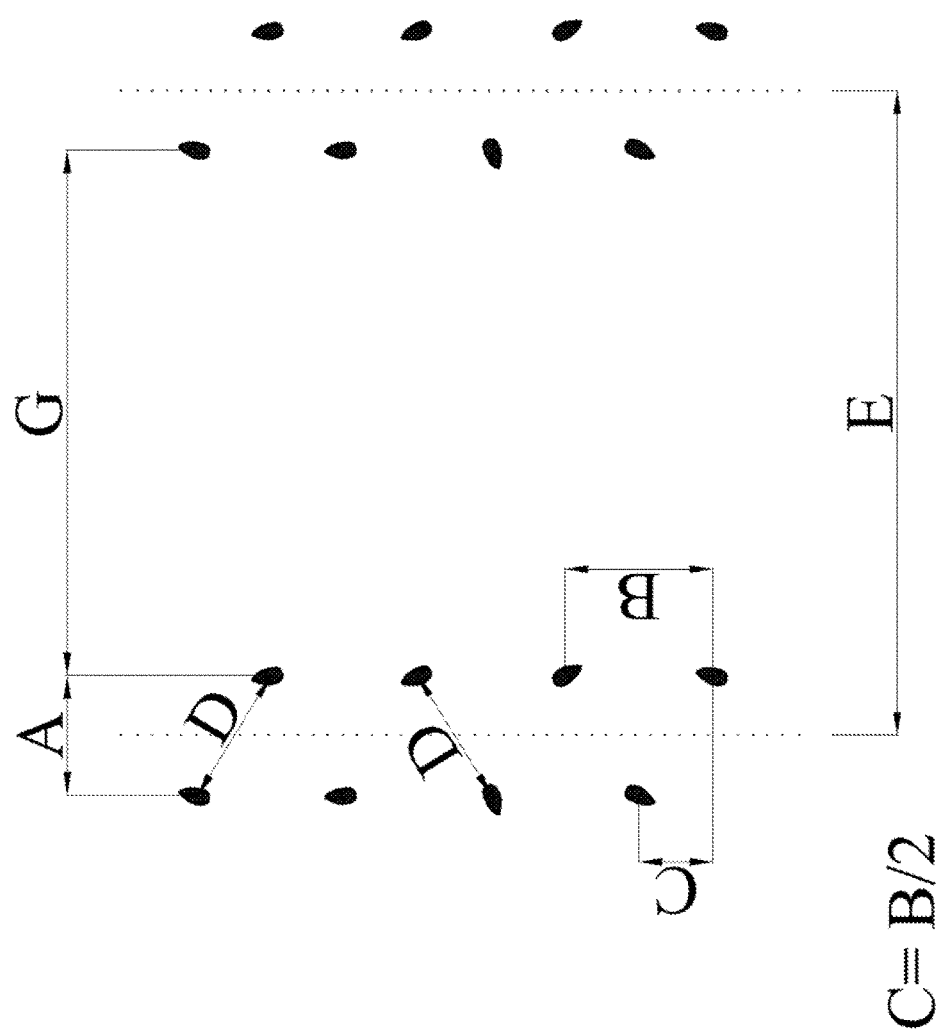
FIG. 6 is a view of the dimensions that are taken as the basis in the sowing process performed by twin (double row) sowing seed distributor body.
Figure 7:
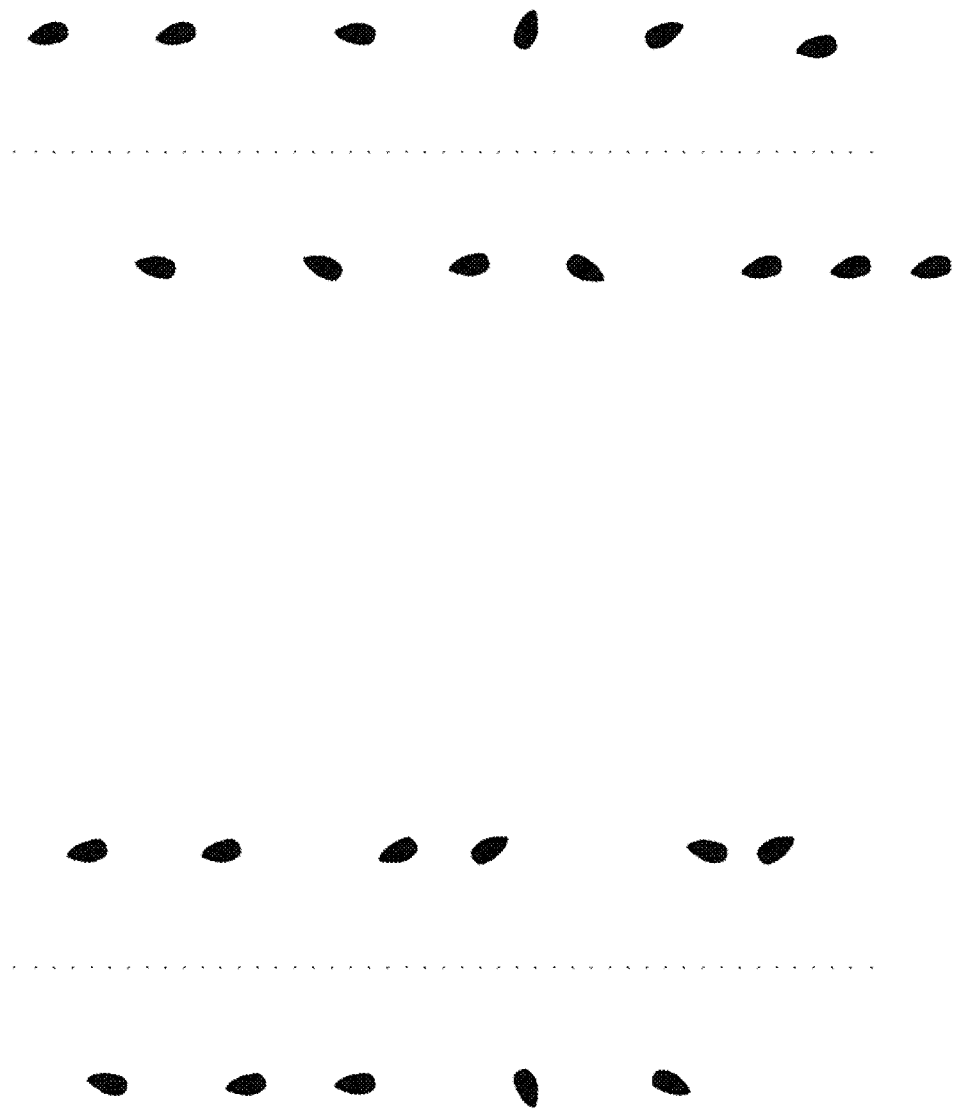
FIG. 7 is a view of the irregular sowing mistakes that might be faced while working with seed distributor row units with two different bodies used in the current system that used by other manufacturers.

In a preferred embodiment of the invention, spacing between two discs (distance A in FIG. 6) of twin row seed distributor body (10) can be adjusted to any desired distance and automatically controlled by a button by changing the dimensions of twin row seed distributor body (10) to a telescopic mechanism.

In a preferred embodiment of the invention, spacing (distance A in FIG. 6) between two seeding disc(4.*a*-4.*b*) can be adjusted by a spring mechanism.

In a preferred embodiment of the invention, twin row seed distributor body (10) can be manufactured in two pieces and combined by means of various fasteners in order to obtain one seed distributor body.

In a preferred embodiment of the invention, shaft bearing group (11) can be supported by bushes without using ball bearing (11.3).

In a preferred embodiment of the invention, seeding disc motion shaft group (15) can be manufactured in one piece.

In a preferred embodiment of the invention, besides air suction vacuum formed on both sides of the body, due to the air blowing system also formed on both sides of the body, seeds going from the seed hopper to the seed distributor body divide into two inside the body, adhere to the holes on two separate seeding disc and remain on these discs (4.*a*-4.*b*) until seeds reach the sowing components.

The seeds coming from the seed storage and its lid (8) to the twin seed distributor bodies (10) by means of the air-suction vacuum designed on both parts of the body are split in half within the body. Afterwards, it is allowed the seeds to stay on the seed distributor discs (4*a*-4*b*) through sticking to holes on the separate two seed distributor discs (4*a*-4*b*) until the seeds reach the sower member. Functions of the inner trigger (3*a*-3*b*) and the outer trigger (5*a*-5*b*) here is to perform the process of making, i.e. singling, the seeds that are on the sower seed distributor discs (4*a*-4*b*) and stuck into holes single through the seed distributor discs (4*a*-4*b*). Thus, it is ensured that a single seed remains on holes of the sower discs (4*a*-4*b*) to which dual seeds stuck.

I claim:

1. A twin row seed distributor apparatus comprising:
   a single twin row seed distributor body adapted to synchronously sow two different sowing rows simultaneously;
   at least one right seeding disc and at least one left seeding disc positioned on said single twin row seed distributor body;
   at least one shaft bearing assembly cooperative with said at least one right seeding disc and said at least one left seeding disc so as to allow said at least one right seeding disc and said at least one left seeding disc to move in said single twin row seed distributor body;
   at least one seeding disc motion shaft connecting the at least one shaft bearing assembly to said at least one right seeding disc and to said at least one left seeding disc so as to synchronize movement of said at least one right seeding disc and said at least one left seeding disc;
   at least one modular main body inner bearing cover forming a bearing for said at least one seeding disc motion shaft, said at least one modular main body inner bearing cover adapted to enable mounting and maintenance of gears for said at least one seeding disc motion shaft with said single twin row seed distributor body; and
   a hinged seed window affixed to said single twin row seed distributor body so as to discharge seed from said single twin row seed distributor body.

2. The twin row seed distributor apparatus of claim 1, further comprising:
   a right inner singulator on a right side and a left inner singulator on a left side of said single twin row seed distributor body.

3. The twin row seed distributor apparatus of claim 1, further comprising:
   a right disc vacuum body cover on a right side and a left disc vacuum body on a left side of said single twin row seed distributor body.

4. The twin row seed distributor apparatus of claim 1, further comprising:
   a right outer singulator on a right side and a left outer singulator on a left side of said single twin row seed distributor body.

5. The twin row seed distributor apparatus of claim 1, wherein said at least one shaft bearing assembly has at least one motion transmission shaft.

6. The twin row seed distributor apparatus of claim 1, wherein said at least one shaft bearing assembly contains at least one ball bearing.

7. The twin row seed distributor apparatus of claim 1, wherein said at least one shaft bearing assembly has at least one seal so as to prevent dust intrusion.

8. The twin row seed distributor apparatus of claim 1, wherein said at least one shaft bearing assembly has at least one shim and at least one retaining ring.

9. The twin row seed distributor apparatus of claim 5, further comprising:
   a shaft bearing bushel supporting said at least one motion transmission shaft.

10. The twin row seed distributor apparatus of claim 1, further comprising:
   at least one screw connecting a shaft bearing body of said at least one shaft bearing assembly to said single twin row seed distributor body.

11. The twin row seed distributor apparatus of claim 5, further comprising:
   a disc shaft motion gear cooperative with said at least one motion transmission shaft such that rotational motion of said at least one motion transmission shaft is transmitted to said disc motion shaft.

12. The twin row seed distributor apparatus of claim 11, further comprising:
   a disc motion hexagon mounted to said disc motion shaft so as to provide motion to said at least one right seeding disc and to said at least one left seeding disc.

13. The twin row seed distributor apparatus of claim 5, further comprising:
   at least one bearing bush forming a bearing for the disc motion shaft on said single twin row seed distributor body.

* * * * *